United States Patent [19]

Arnold, Jr. et al.

[11] Patent Number: 4,622,355

[45] Date of Patent: Nov. 11, 1986

[54] RADIATION-HARDENED POLYMERIC FILMS

[75] Inventors: Charles Arnold, Jr.; Robert C. Hughes; R. Glen Kepler; Steven R. Kurtz, all of Albuquerque, N. Mex.

[73] Assignee: The United States of America as represented by the United States Department of Energy, Washington, D.C.

[21] Appl. No.: 632,347

[22] Filed: Jul. 16, 1984

[51] Int. Cl.$^4$ ............................................. C08J 5/34
[52] U.S. Cl. ................................. 524/89; 524/209; 524/257; 524/259; 252/500
[58] Field of Search ............... 252/500, 501.1, 518; 524/236, 89, 209, 257, 259; 525/377, 374; 528/491, 492; 361/311, 323; 174/137 B, 138 C, 110 R, 110 SR, 110 V

[56] References Cited

U.S. PATENT DOCUMENTS

| | | | |
|---|---|---|---|
| 3,424,698 | 1/1969 | Lupinski et al. | 252/518 |
| 4,293,452 | 10/1981 | Fox et al. | 252/518 |
| 4,359,411 | 11/1982 | Kim et al. | 252/500 |
| 4,374,048 | 2/1983 | Kim et al. | 252/500 |
| 4,418,187 | 11/1983 | Muench et al. | 252/511 |
| 4,529,538 | 7/1985 | Kim | 524/236 |

OTHER PUBLICATIONS

Kurtz et al, "Effect of Chemical Doping on the Radiation Induced Conductivity of Polyethylene Terephthalate", Sandia Nat'l Laboratories, *Appl. Phys. Lett.*, 43(12) 12-15-83.

*Primary Examiner*—Josephine L. Barr
*Attorney, Agent, or Firm*—Armand McMillan; Albert Sopp; Judson R. Hightower

[57] ABSTRACT

The radiation-induced conductivity of polymeric dielectrics with low electronic mobility is reduced by doping with electron donor or electron acceptor compounds at a level of $10^{15}$ to $10^{21}$ molecules of dopant/cm$^3$. Polyesters, polyolefins, perfluoropolyolefins, vinyl polymers, vinylidene polymers, polycarbonates, polysulfones and polyimides can benefit from such a treatment. Usable dopants include 2,4,7-trinitro-9-fluorenone, tetracyanethylene, 7,7,8,8-tetracyanoquinodimethane, m-dinitrobenzene, 2-isopropylcarbazole, and triphenylamine.

14 Claims, No Drawings

RADIATION-HARDENED POLYMERIC FILMS

The U.S. Government has rights in this invention pursuant to Contract No. DE-AC04-76DP00789 between the U.S. Department of Energy and AT&T Technologies, Inc.

BACKGROUND OF THE INVENTION

The present invention relates to doped polymeric films used as radiation hard, i.e., low radiation-induced conductivity, dielectrics.

The use of polymeric dielectrics is increasing in severe radiation environments such as those encountered in space, fusion and fission reactors, and weapon systems. Glass and ceramic insulators cannot replace polymeric materials in components requiring the mechanical flexibility or the low melting temperature of certain polymers. These components include cable-sheathing and "weaklink" capacitors which must short-out in fire accident environments for safety purposes.

In radiation environments, however, the radiation-induced conductivity (RIC) of polymeric dielectrics can render these materials useless for voltage hold-off and energy storage in capacitors, cables, and coatings. In such applications, it is often desirable that a polymer display the lowest possible RIC and retain superior dielectric properties such as high breakdown voltage, low current leakage, and the like.

Many excellent dielectric polymers have been patented for unique applications and operating environments. Thus, polyethylene terephthalate (PET) compositions containing various additives have been used in situations where fire retardance is desired (Dodson et al, U.S. Pat. No. 3,884,870; Akagi et al, U.S. Pat. No. 4,344,874; Hecht et al, U.S. Pat. No. 4,338,243). Other dielectric compositions, e.g., polytetramethylene terephthalate, as well as methods to improve dielectric properties of polymers in radiation-free environments have been disclosed (Smith et al, U.S. Pat. No. 4,000,109, and Betts et al, U.S. Pat. No. 4,209,566). PET chips have also been used in neutron radiation shielding (Blanco, U.S. Pat. No. 3,106,535).

It has also been disclosed that photo-conductive insulators such as certain epoxy resins can have their photo-conductivity increased by doping with Lewis acids such as 2,4,7-trinitro-9-fluorenone (TNF) (Mammino, U.S. Pat. No. 3,408,184).

None of this art is concerned with the development of radiation hard polymer dielectrics with low radiation-induced conductivities.

OBJECTS OF THE INVENTION

An object of the present invention is to provide polymeric dielectric materials having significantly reduced radiation-induced conductivity (RIC). Another object is to provide polymeric dielectric materials that retain the advantageous properties of organic polymers and have a RIC comparable to some of the best inorganic insulative materials. Still another object is to decrease the RIC of conventional low electronic mobility polymeric dielectrics. A further object is to provide polymeric insulative materials that can be used as electrical insulation or in capacitors exposed to severe radiation and retain high breakdown voltage and low current leakage characteristics.

Various other objects, features and attendant advantages of the present invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the present invention, there is now provided polymeric dielectric materials with reduced radiation-induced conductivity, containing from about $10^{15}$ to $10^{21}$ molecules/cm$^3$ of compatible electron acceptor or electron donor dopants. The polymeric compounds that can benefit from such doping in the manner disclosed are low electronic mobility dielectrics such as polyesters, polyolefins, perfluorinated polyolefins, vinyl polymers, vinylidene polymers, polycarbonates, polysulfones, and polyimides. The dopants include such Lewis acids as 2,4,7-trinitro-9-fluorenone, tetracyanoethylene, 7,7,8,8-tetracyanoquinodimethane, m-dinitrobenzene, diketonates, as well as electron donors such as 2-isopropylcarbazole and triphenylamine.

DETAILED DESCRIPTION OF THE INVENTION

The usefulness of a particular polymer dielectric in a radiation environment is often determined by its radiation-induced conductivity (RIC). For energy storage or voltage hold off applications, a minimum RIC is desirable.

It has now been discovered that otherwise competent polymeric dielectric materials can be further radiation hardened, i.e. can have their RIC reduced, by incorporating into them a low critical concentration of chemical impurities, i.e. dopants, which consist of electron donor or electron acceptor compounds. The polymeric dielectrics that best benefit from this inclusion of impurities within them are those with low electronic mobility, for instance polyethylene terephthalate.

Another manner of identifying such polymers is to consider their particular value for the parameter "$\gamma$", which represents a "figure of merit" for the performance of a dielectric in a radiation environment. A value of $\gamma$ can be assigned to a dielectric, inter alia, by measuring the open circuit voltage of a capacitor after exposure to a pulse of radiation, as shown in the following equation:

$$V_f/V_i = \exp(-D\gamma)$$

in which: $V_f$ is the final voltage on the capacitor; $V_i$ is the initial voltage; D is the radiation dose; and $\gamma$ is the material specific parameter being discussed.

Values for $\gamma$ have been established for a number of dielectrics by pulsed x-rays, using single layers of dielectric with evaporated metal contacts irradiated in vacuum. Thus, it has been found that: polyethylene terephthalate has a $\gamma(\text{rad}^{-1})$ of $2\times10^{-4}$; polysulfone, $1.5\times10^{-5}$; and polyvinylidene fluoride (PVF$_2$), $3\times10^{-6}$. In terms of $\gamma$, therefore, the polymeric dielectrics that benefit most from the doping of the present invention are those having a $\gamma$ value of $\geq$ about $10^{-3}$. It should be noted here that actual use of any of these polymeric dielectrics in particular environment must also depend on their other chemical and physical properties, such as stability, glass transition temperature, and so on. A more detailed discussion of these physical and mathematical considerations affecting the present invention is provided by Kurtz et al, "The Development of a Radiation Hardened Polymer Dielectric by Chemical Doping," IEEE, Trans. Nucl. Sci. NS-30, 4077 (1983), which is incorporated herein by reference.

Specific types of materials which meet the requirements of the invention include polyesters, polycarbonates, polysulfones, polyolefins, fluorinated polyolefins, vinyl polymers, vinylidene polymers and polyimides.

As to the chemical dopants which can successfully reduce the RIC of the suitable polymeric dielectrics just described, they consist generally of Lewis acids and electron donor compounds. These include 2,4,7-trinitro-9-fluorenone (TNF, an electron acceptor), m-dinitrobenzene (an acceptor), 7,7,8,8-tetracyanoquinodimethane (TCNQ, an acceptor), tetracyanoethylene (TCN, an acceptor), boron diketonates (acceptors), 2-isopropylcarbazole (IPC, a donor), and triphenylamine (TPA, a donor). Numerous other compounds within the two classes mentioned can also be used in various concentrations with differing effectiveness. These include hydroxyphenylalkanes, phenylalkanes, phenols, quinones, nitro- and cyano-substituted unsaturated and aromatic hydrocarbons, substituted carbazoles, aromatic amines, and the like.

The concentration of dopant incorporated in low electronic mobility polymers susceptible to RIC reduction ranges from $10^{15}$ to $10^{21}$ molecules/cm$^3$, with a range of about $10^{18}$ to $10^{19}$ preferred in the case of the most effective compounds. At concentrations beyond the above ranges, the dielectrics RIC may increase rather than decrease due to the onset of charge carrier hopping between the dopant molecules, which no longer act as deep electronic traps at high concentrations. Interestingly, polyvinyl carbazole-a high radiation photoconductivity material with a $\gamma(rad^{-1})$ value of $4 \times 10^{-1}$, showed an increase in RIC when doped with TNF. This is in contrast with the behavior of PET, a lower electronic mobility, lower radiation-induced photoconductivity dielectric with a $\gamma(rad^{-1})$ value of $2 \times 10^{-4}$, which shows a large RIC reduction upon doping as reported in the examples below.

The doped polymeric dielectrics of the present invention are prepared by immersing a film of the polymer in a solution of the selected electron acceptor or donor material, then washing the film and heating it to remove the solvent.

A broad range of solvents can be used to dope polymeric dielectrics. The choice of solvent depends on the nature and properties of the polymeric dielectric and the dopant. For example, the solvent must be capable of dissolving the dopant at the desired doping termperature and must swell, but not dissolve, the polymeric dielectic. In addition, the solvent must be sufficiently high boiling so that it does not evaporate during the doping process. Low boiling solvents such as chloroform or methyl ethyl ketone can be used when doping is carried out at ambient temperatures. In general, one chooses a solvent whose solubility parameter, $\delta$, does not differ by more than 3–4 units from that of the polymeric dielectric. The solubility parameter, $\delta$, is defined as the square root of the cohesive energy density and is numerically equivalent to the potential energy per cubic centimeter of the material. Solubility parameters for both solvents and polymers may be found in "Encyclopedia for Polymer Science", Editors, H. F. Mark, N. G. Gaylord, N. M. Bikales, Vol. 3, pp 833–862, Wiley Interscience, New York, (1965). Solvents with solubility parameters in the range of 7 to 14 (cal/cm$^3$)$^{\frac{1}{2}}$ can be used in this process. Preferred solvents for most dopants are high boiling, hydrogen-bonded liquids with cohesive energy densities in the range of 10 to 14 (cal/cm$^3$)$^{\frac{1}{2}}$. Examples of suitable solvents are benzyl alcohol and ethylene glycol.

The process is carried out by soaking a film with a thickness of 1 to 1,500 microns in the dopant solution at a temperature ranging from ambient levels to 200° C. for a period of 0.1 second to 100 hours. The actual parameter selected in a given treatment will of course be dictated by the nature of the polymer, the dopant used, the concentration of the dopant in the solution, the dopant concentration to be achieved in the dielectric, the temperature and the process duration selected. The value of some of these process parameters will also depend to some extent on the scale of the operation involved.

In any event, the polymeric film may be treated in a batch process, in which case it will remain stationary, or it may be treated in a continuous manner, in which case it will be moving linearly through the dopant solution. It may be desirable to place the film under some tension, but not so much as would break the soaked film. During the film's residence in the dopant solution, a certain degree of temporary swelling takes place, which facilitates the diffusion of the dopant throughout the film volume. After the film has reached the desired concentration of dopant, i.e., $10^{15}$ to $10^{21}$ molecules/cm$^3$, it is then washed with water, methanol, or an aprotic solvent such as dimethylformamide (DMF) and dimethylsulfoxide (DMSO). Solvent removal is then effected by exposing the film to a temperature ranging from ambient to 200° C. at a pressure ranging from $10^{-6}$ torr to ambient atmospheric pressure. Again, materials and scale will influence the particular conditions to be used.

In this respect, it has been found that the preferred conditions for large scale continuous impregnation of polyethylene terephthalate (PET) film by 2,4,7-trinitro-9-fluorenone are as follows:

| | |
|---|---|
| PET film thickness | 1 to $10^3$ microns |
| TNF solution concentration | 0.005 to 0.01 g/cm$^3$ |
| TNF solvent | ethylene glycol |
| Immersion time | 2 to 10 seconds |
| Immersion temperature | 140 to 160° C. |
| Wash media | DMF, then water |
| Solvent removal temperature | 50 to 200° C. |
| Solvent removal time | 1 to 3 minutes |

EXAMPLE I

In a continuous impregnation operation such as that just discussed, crystalline polyethylene terephthalate film (Mylar ®) with a thickness of 12 microns was passed through a solution of 0.005 g/cm$^3$ TNF in ethylene glycol at 160° C. in 10 seconds. The impregnated film was then washed with DMF and water, consecutively, at a temperature of 25° C. for a period of five seconds, and then dried at 140° C. for at two minutes. The rather severe doping conditions employed in this particular example had only a minimal effect on such critical film properties as extent of crystallinity, density, tensile strength, and modulus. It was also found that the RIC of Mylar films treated at elevated teaperatures was lower than that of those made at lower temperature.

The RIC of the polyethylene terephthalate film prepared according to the process of this example, which contained $10^{19}$ molecules TNF/cm$^3$, was found to be comparable to that of mica paper. As expressed in terms of $\gamma(\text{rad}^{-1})$, the RIC of the material decreased from $2\times 10^{-4}$ to $1\times 10^{-6}$. Mica paper under the same testing conditions shows a value of $7.3\times 10^{-7}$.

EXAMPLE II

On impregnation of polyethylene terephthalalate (PET) film with TNF to concentrations ranging from $10^{16}$ to $10^{20}$ molecules TNF/cm$^3$ of PET, it was found that the x-ray induced photocurrent after two minutes of irradiation decreased from 120 picoamperes to 1 picoampere as the TNF concentration in the treated film increased from $10^{16}$ to $10^{19}$ molecules TNF/cm$^3$. At TNF concentrations greater than $10^{20}$ molecules/cm$^3$, the photoconductivity of the doped film increased dramatically to a value greater than that of the original undoped film.

DC photoconductivity values were obtained by applying a voltage of 290 KV/cm to the film sample, which was then irradiated at the rate of 30 rads/second while the photocurrent was monitored. An x-ray source operating at 60 KV was used for the irradiation.

EXAMPLE III

PET-TNF film was prepared from a solution of TNF in benzyl alcohol at the desired doping concentration. The ~0.5 mil thick film was placed in the solution at ambient temperature and allowed to swell for 48 hours. It was then dried at 72° C. for 24 hours at 0.5 Torr in an Abderhalden drying apparatus.

At optimum TNF concentrations, i.e. $10^{18}$ to $10^{19}$ TNF molecules/cm$^3$, DC and transient photoconductivity measurements revealed that the RIC of PET-TNF film is comparable to the smallest RIC observed for any dielectric by the present inventors. The photoconductivity data thus obtained indicated that the charge loss of a PET-TNF capacitor subjected to a pulse of high energy radiation, will be ~1% of that observed for a capacitor made with the most widely used capacitor dielectric, namely heat treated PET (Mylar ®).

Transient photoconductivity values are obtained by subjecting dielectric films to a short (3 ns) x-ray pulse (200–400 KeV) using a Febetron 706 as the radiation source, and recording the integrated displacement current.

From the foregoing description, one skilled in the art can easily ascertain the essential characteristics of this invention, and without departing from the spirit and the scope thereof, can make various modifications to adapt it to different uses and conditions.

We claim:

1. Polymeric dielectric compositions with reduced radiation-induced conductivity, containing from about $10^{15}$ to 1021 molecules/cm$^3$ of a compatible organic Lewis acid or Lewis base as dopant, said dielectric being a low electronic mobility polymer selected from the group consisting of polyesters, polyolefins, perfluorinated polyolefins, vinyl polymers, vinylidene polymers, polycarbonates, polysulfones, and polyimides.

2. The composition of claim 1 wherein the polymer is a polyethylene terephthalate.

3. The composition of claim 1 wherein the dopant is a Lewis acid.

4. The composition of claim 3 wherein the Lewis acid is 2,4,7-trinitro-9-fluorenone.

5. The composition of claim 3 wherein the Lewis acid is tetracyanoethylene.

6. The composition of claim 3 wherein the Lewis acid is 7,7,8,8-tetracyanoquinodimethane.

7. The composition of claim 3 wherein the Lewis acid is m-dinitrobenzene.

8. The composition of claim 4 wherein the concentration of the dopant is within the range of about $10^{18}$ to $10^{19}$ molecules/cm$^3$.

9. The composition of claim 1 wherein the dopant is 2-isopropylcarbazole or triphenylamine.

10. A process for the reduction of radiation-induced conductivity in a polymeric dielectric, comprising immersing the dielectric in a solution of an electron donor or an electron acceptor dopant, washing the resulting swollen dielectric, and removing the solvent.

11. The process of claim 10 wherein the dopant solution has a concentration approximately similar to the concentration of dopant desired in the reduced radiation-induced conductivity dielectric.

12. The process of claim 11 wherein the dopant solution consists of a Lewis acid dissolved in benzyl alcohol or ethylene glycol.

13. The process of claim 11 wherein the dopant is 2,4,7-trinitro-9-fluorenone.

14. The process of claim 10 wherein the dielectric is a polyethylene terephthalate film with a thickness between about 1 and 1000 microns, and wherein: (a) the immersion is carried out for 2 to 10 seconds at about 140° to 160° C. in an about 0.005 g/cm$^3$ solution of 2,4,7-trinitro-9-fluorenone in ethylene glycol, and (b) the removal of the solvent is effected at about 50° to 2000° C. for a period of about 1 to 3 minutes at a pressure about 1 to 760 torrs.

* * * * *

UNITED STATES PATENT AND TRADEMARK OFFICE
CERTIFICATE OF CORRECTION

PATENT NO. : 4,622,355

DATED : November 11, 1986

INVENTOR(S) : Charles Arnold, Jr.; Robert C. Hughes; R. Glen Kepler; Steven R. Kurtz It is certified that error appears in the above-identified patent and that said Letters Patent is hereby corrected as shown below:

In claim 1, line 3;

Correct line 3 to read as follows:

-- $10^{15}$ to $10^{21}$ molecules/cm$^3$ of a compatible organic --

Signed and Sealed this

Twenty-eighth Day of April, 1987

Attest:

DONALD J. QUIGG

Attesting Officer

Commissioner of Patents and Trademarks